US012021834B2

United States Patent
Hall et al.

(10) Patent No.: US 12,021,834 B2
(45) Date of Patent: *Jun. 25, 2024

(54) CUMULATIVE SUM MODEL FOR IP DENY LISTS

(71) Applicant: Wells Fargo Bank, N.A., San Francisco, CA (US)

(72) Inventors: Bryan D. Hall, Charlotte, NC (US); Richard Joseph Schroeder, Charlotte, NC (US); Nicola A. Maiorana, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,303

(22) Filed: Jun. 9, 2023

(65) Prior Publication Data

US 2023/0353537 A1    Nov. 2, 2023

Related U.S. Application Data

(63) Continuation of application No. 17/303,776, filed on Jun. 7, 2021, now Pat. No. 11,722,459.

(51) Int. Cl.
*H04L 9/40* (2022.01)

(52) U.S. Cl.
CPC ........ *H04L 63/0236* (2013.01); *H04L 63/083* (2013.01); *H04L 63/1416* (2013.01); *H04L 63/20* (2013.01)

(58) Field of Classification Search
CPC .............. H04L 63/0236; H04L 63/083; H04L 63/1416; H04L 63/20
USPC ......................................................... 726/26
See application file for complete search history.

(56) References Cited

U.S. PATENT DOCUMENTS

| 7,366,761 | B2 | 4/2008 | Murray et al. |
| 8,272,033 | B2 | 9/2012 | Wasmund |
| 8,387,145 | B2 | 2/2013 | Xie et al. |
| 8,612,560 | B2 | 12/2013 | Oliver et al. |
| 9,125,130 | B2 | 9/2015 | Setia et al. |
| 9,148,424 | B1 | 9/2015 | Yang |
| 9,148,432 | B2 | 9/2015 | Yost |

(Continued)

FOREIGN PATENT DOCUMENTS

CN       100471172 C    3/2009

OTHER PUBLICATIONS

"U.S. Appl. No. 17/303,776, Examiner Interview Summary dated Mar. 31, 2023", 2 pgs.

(Continued)

*Primary Examiner* — Teshome Hailu
(74) *Attorney, Agent, or Firm* — SCHWEGMAN LUNDBERG & WOESSNER, P.A.

(57) ABSTRACT

In an example aspect, a method includes receiving a plurality of login attempts from a network address over a length of time, querying log data to determine, for the network address, an average number of login failures of the plurality of login attempts over the length of time, calculating a failure rate metric based on the average number of login failures, determining that, the failure rate metric exceeds a reference number of login failures for the length of time, the reference number of login failures based on a historical average number of login failures for the length of time, and based in part on the determining, adding the network address to a system deny list.

17 Claims, 8 Drawing Sheets

(56) References Cited

U.S. PATENT DOCUMENTS

| | | |
|---|---|---|
| 9,210,102 B1 | 12/2015 | Wise |
| 9,396,316 B1 | 7/2016 | Altman |
| 9,401,924 B2 | 7/2016 | Ge et al. |
| 9,493,089 B2 | 11/2016 | Shin et al. |
| 10,015,175 B2 | 7/2018 | Kent et al. |
| 2004/0199793 A1 | 10/2004 | Wilken et al. |
| 2004/0215975 A1 | 10/2004 | Dudfield et al. |
| 2005/0099288 A1 | 5/2005 | Spitz et al. |
| 2006/0075506 A1 | 4/2006 | Sanda et al. |
| 2008/0155651 A1 | 6/2008 | Wasmund |
| 2016/0080413 A1 | 3/2016 | Smith et al. |
| 2016/0330287 A1 | 11/2016 | Smith |
| 2017/0034161 A1 | 2/2017 | Isola et al. |
| 2017/0134362 A1 | 5/2017 | Randall et al. |
| 2018/0004948 A1 | 1/2018 | Martin et al. |
| 2020/0195672 A1 | 6/2020 | Mugambi et al. |

OTHER PUBLICATIONS

"U.S. Appl. No. 17/303,776, Non Final Office Action dated Sep. 30, 2022".

"U.S. Appl. No. 17/303,776, Notice of Allowance dated Apr. 14, 2023".

"U.S. Appl. No. 17/303,776, Response filed Mar. 29, 2023 to Non Final Office Action dated Sep. 30, 2022", 9 pgs.

Javed, Mobin, "Detecting stealthy, distributed SSH brute-forcing", Proceedings of the 2013 ACM SIGSAC, pp. 85-96, (Nov. 2013), 11 pgs.

Peng, Tao, et al., "Detecting Distributed Denial of Service Attacks Using Source IP Address Monitoring", (2002), 14 pgs.

U.S. Appl. No. 17/303,776, filed Jun. 7, 2021, Cumulative Sum Model for IP Deny Lists.

CUMULATIVE SUM MODEL FOR IP DENY LISTS

CROSS-REFERENCE TO RELATED APPLICATION

This application is a continuation of U.S. patent application Ser. No. 17/303,776, filed Jun. 7, 2021, which is incorporated by reference herein in its entirety.

BACKGROUND

Billions of people around the world use various different communication and computing devices on a daily basis for many different purposes such as social networking, conducting personal business (e.g., financial transactions), conducting work-related activities, online shopping, browsing the web and/or engaging in other forms of Internet communication for entertainment purposes or to gather the news of the day, and/or the like. Indeed, digital communications and computing have become increasingly ubiquitous presences in modern life, and that trend is only expected to continue.

With the increased use and pervasiveness of digital communications and computing comes increased complexity. As an example, a financial-services institution may interact with its customers many billions of times per year in ways such as in person at storefront locations (e.g., banks), online (via, e.g., web portals, mobile applications ("apps"), and/or the like), at automated teller machines (ATMs), on the telephone, and/or the like. There are many organizations, such as large, complex; multinational corporations (including financial-services institutions), that operate and manage large, complex information technology (IT) ecosystems for both internal operations and for customer-facing activities, among other purposes. These ecosystems typically contain many different interoperating systems, servers, applications, interfaces, and the like. It is important to such organizations and their customers that these ecosystems operate reliably and effectively.

One ongoing, seemingly ever-present threat to the continued reliable and effective operation of these ecosystems and indeed of many online systems and other resources is the repeated attempts by nefarious actors to gain access (e.g., log in) to these systems, attempting to appear to such systems to be valid, authorized users. These malicious login attempts are carried out by both actual people and by programs (e.g., so-called "bots") that these bad actors create or at least use. These attackers, including both people and bots, are persistent, and continue to adjust their attack strategies in an effort to circumvent defensive measures. They often obtain lists that may or may not contain identifiers (e.g., usernames) of valid users of a system. Their attacks are accordingly often aimed at attempting to narrow such lists down to those identifiers that are associated with valid accounts, which the attackers then try to exploit in some manner. IT teams, fraud-prevention teams, and/or others count among their goals to protect their respective ecosystems, and thus their customers, against fraudulent access (e.g., login) attempts and other threats.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

As described above, there is a constant threat from bots or human users with respect to account security. One particular threat is one in which a set of credentials from one service are tested on a second service. The risk presented by such a threat is not just that an account may be compromised, or that a system may be overloaded, but the attempts may also lock a customer out of their account.

For example, consider that a person Alice, has an account at a first service in which Alice uses "Username1" as her username with a password "p0WrDs401." The first service may suffer a data breach leaking Alice's credentials. Alice may have used the same username at a second service but a different password. Then, an automated attack may occur on the second service testing the data from the breach of the first service. Because the password of the first service does not match the password of the second service, Alice may eventually be locked out of her account based on too many incorrect password attempts. An even worse scenario may be that Alice uses the same password on both accounts and her account becomes compromised without her knowing.

In many instances, it may not matter whether Alice even had an account the first service. For example, any user with an account at the first service with a username of "Username1" would result in the same lock of Alice at the second service.

In various examples, a threat detection system is described herein that includes a suite of sensors and detectors to identify, among other attacks, these types of non-genuine login attempts. The non-genuine login attempts may be considered to originate from an account validator actor (AVA). An actor may be a human actor or a computing system running an automated script. One approach to address the above adverse behavior is to identify the origin e.g., IP address) of the illicit login requests and add the IP address to a system deny list.

Figure 1:
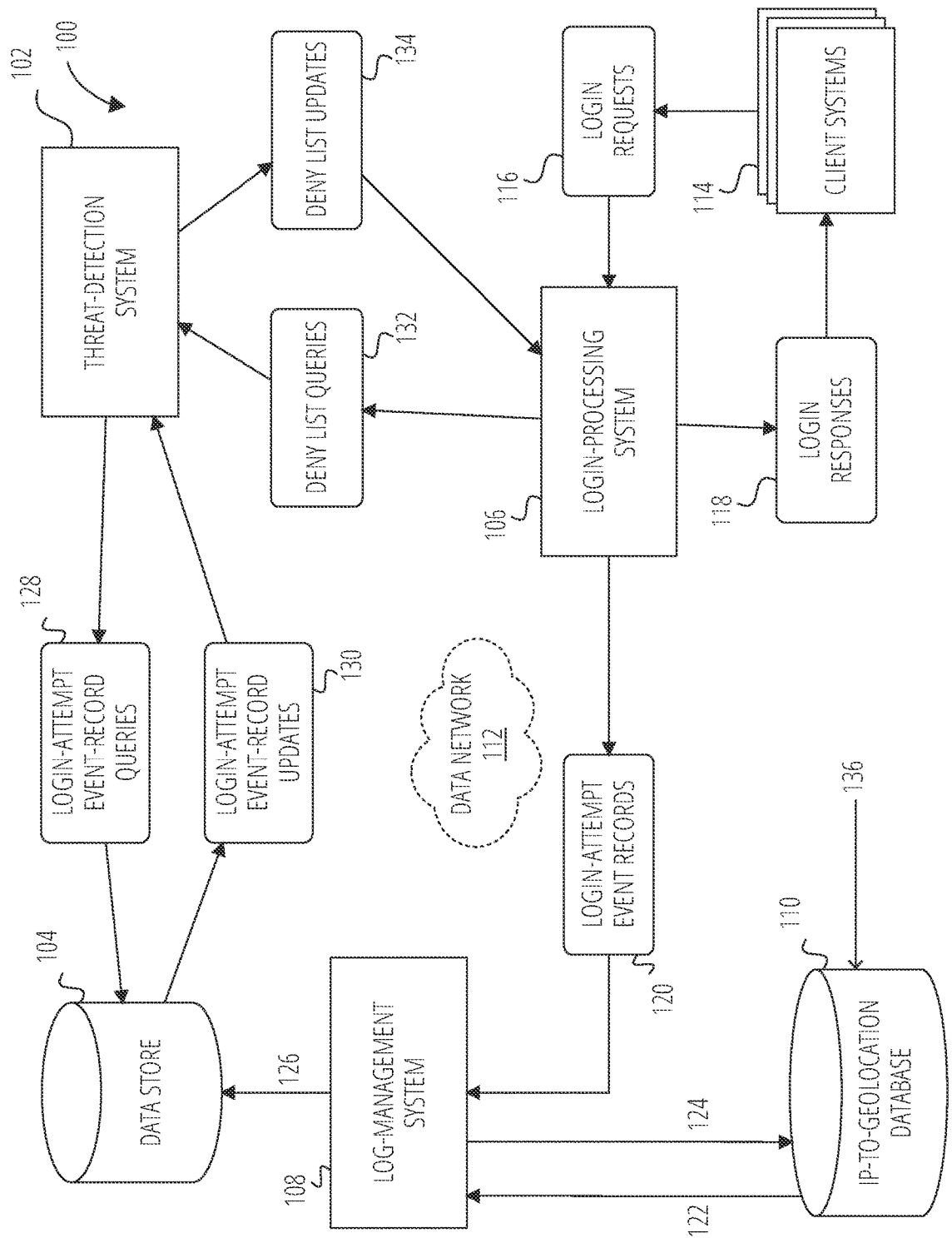
FIG. 1 is a data flow diagram, according to various examples.

FIG. 1 illustrates a data flow diagram 100, according to various examples. Diagram 100 is provided by way of example and not limitation, as the present disclosure may be carried out in numerous different types of communication contexts having different numbers, types, and/or arrangements of devices, networks, and/or the like. Moreover, in different examples, one or more of the entities that are depicted in FIG. 1 may be distributed into multiple different components. Similarly, two or more of the entities that are depicted in FIG. 1 may be combined into fewer components. One or more functional aspects of any given entity may be realized as a standalone component and/or combined with one or more functional aspects of any one or more of the other entities. This flexibility with respect to the distribution, centralization, and/or consolidation of functional aspects of the depicted entities also applies to entities that are depicted in the other figures.

Moreover, a number of arrows are depicted and labeled with reference numerals in FIG. 1 and in some of the other figures. In a number of instances, these arrows are described herein according to the information conveyed along them. It is to be understood that these arrows may represent and/or utilize wired and/or wireless communication links between the various entities. Indeed, any one or more of the communication links depicted in FIG. 1 or in any of the other figures may include one or more wired-communication links (e.g., Ethernet, fiber optic, Universal Serial Bus (USB), and/or the like) and/or one or more wireless-communication links (e.g., Wi-Fi, LTE, Bluetooth, Bluetooth Low Energy, and/or the like). Any communication protocols may be used as deemed suitable by those of skill in the art for a given implementation. Moreover, any one or more of the communication links may include one or more intermediate devices such as routers, bridges, servers, access points, base stations, and/or the like. Any communication link may include one or more virtual private networks (VPNs) and/or other tunneling-type connections, and may utilize one or more security measures such as encryption.

Diagram 100 is illustrated as including a threat-detection system 102, a data store 104, a login-processing system 106, a log-management system 108, an IP-to-geolocation database 110, a data network 112, and a plurality of client systems 114. Diagram 100 also includes login requests 116, login responses 118, login-attempt event records 120, location queries 122, location-query results 124, location-appended login-attempt event records 126, login-attempt event-record queries 128, login-attempt event-record updates 130, deny list queries 132, deny list updates 134, and IP-to-geolocation-database updates 136.

As described above, this depiction is by way of example and not limitation, as different types and/or numbers of entities may be present in different examples. Any (computing and/or communication) entity that is depicted in FIG. 1 and/or any of the other figures may have an architecture and execute software similar to that described below in connection with respect to system 800 of FIG. 8. Moreover, any one or more of these entities may host (e.g., execute) all or part of any of the applications, functions, and/or the like that are described herein by way of example, and/or any other applications, functions, and/or the like that are deemed suitable by those of skill in the art for a given implementation or in a given context.

In various examples, threat-detection system 102, the data store 104, the login-processing system 106, and the log-management system 108 are managed as part of a collective IT ecosystem for an organization such as a financial-services institution. These four entities may be collectively referred to herein at times herein as an enterprise system, which may also include the IP-to-geolocation database 110, though in some embodiments the latter entity is external to the enterprise system. In various example, log-management system 108 may be implemented as a streaming event platform such as Apache Kafka.

Moreover, reference made herein to "a system" or "the system" to which, in a given example, attempts are being made to log in, refers only to the login-processing system 106 and/or to one or more other services or entities (e.g., a web server, an application server, and/or the like) to which a successful login attempt via the login-processing system 106 would provide access. In some examples, the "system" to which login attempts are being directed may refer to a combination of the threat-detection system 102 and the login-processing system 106, or to a combination of all of the entities in the enterprise system. In some examples, the threat-detection system 102 and the login-processing system 106 are different functional parts that are both implemented by a single component (e.g., a server). In other examples, those two entities are realized in or as physically separate entities (e.g., servers). Furthermore, one or more of the entities that are depicted in FIG. 1 may include a user interface or provide, e.g., administrative access over a network to a management interface and/or the like.

The client systems 114 represent a plurality of different devices and systems that can be used to attempt to log in to a system via the login-processing system 106. The client systems 114 may include servers (e.g., at server farms), hots, personal computers (e.g., desktops, laptops), mobile devices (e.g., executing mobile apps), and/or the like. As an additional example, any one or more of the client systems 114 may be or include an automated teller machine (ATM) that provides conventional ATM-type services such as cash withdrawal, check deposit, account transfers, balance inquiries, bill payment, and/or the like. Users may access such ATMs using a secure card, a mobile device, and/or the like, along with security credentials such as a personal identification number (PIN), password, passcode, and/or the like. In some implementations, biometric authentication is used by one or more client systems 114, such as by one or more ATMs.

As shown in FIG. 1, individual client systems 114 submit login requests 116 via the data network 112 to the login-processing system 106. The processing of such login requests 116 is further described herein. After processing the login requests 116, the login-processing system 106 transmits login responses 118 via the data network 112 to the client systems 114. The login responses 118 may be login-granted responses, login-denied responses, or further-processing responses, as examples. An example of a further-processing response may be a request to answer one or more security questions, a request to enter a one-time password (e.g., numerical code) that is texted to a user's mobile device and/or e-mailed to a user's e-mail address, a request to enter a code from an authenticator app, and/or the like. Such further-processing responses are examples of supplementary authentication protocols that are often referred to as falling under the rubric of two-factor authentication (2FA).

In an example scenario, the data network 112 may be a data-communication network such as, including, or in communication with the Internet. The data network 112 may operate according to a suite of communication protocols such as Transmission Control Protocol (TCP) and FP (collectively, TCP/IP), User Datagram Protocol (UDP) and IP (collectively, UDP/IP), and/or others. Furthermore, the data network 112 may be or include a private IP network that is operated by an institution such as a financial-services institution as an example. In addition to other functions such as those described herein, the login-processing system 106 may provide network-access-server (MAS) functions, gateway services, firewall protections, and/or the like between the data network 112 and entities such as one or more of the threat-detection system 102, the data store 104, the log-management system 108, and the IP-to-geolocation database 110, as examples. Any of the entities in communication with one another in the communication context 100, whether via the data network 112 or not, may communicate via a VPN and/or another type of secure-tunneling communication protocol, connection, and/or the like. Such communications may be encrypted.

As depicted in FIG. 1, the login-processing system 106 transmits login-attempt event records 120 to the log-management system 108. The transmission by the login-processing system 106 of the login-attempt event records 120 to the log-management system 108 may or may not be part of the procedures that the login-processing system 106 carries out to actually process the login requests 116 to determine how to handle them (e.g., whether to grant them, deny them, submit them to further processing, etc.).

Some example data that may be included in one or more of the login-attempt event records 120 includes data items that are received by the login-processing system 106 in the respective login requests 116. These data items may include fields such as source IP address, username, user agent string, nonce value, and/or other request-header information. A user agent string may be a set of request-header metadata that indicates information such as web-browser type, web-browser version, operating system being run on the respective one of the client systems 114, and/or the like. In an embodiment, the login-attempt event records 120 that are transmitted from the login-processing system 106 to the log-management system 108 do not include geolocation data that, if present, would indicate a geographic location associated with the particular login requests 116 that correspond to the particular login-attempt event records 120.

In various examples, log-management system 108 is configured to receive login-attempt event records 120 from login-processing system 106, augment those login-attempt event records 120 with geolocation information, and then transmit corresponding location-appended login-attempt event records 126 to the data store 104. In various examples, login-attempt event records 120 are sent to data store 104 without processing or querying 1P-to-geolocation database 110.

In various examples, a login attempt may fail for a variety of reasons. The type of failure may be identified in login-attempt event records 120. Types of failures may include, but are not limited to backend systems not being available, a username does not exist, password is incorrect, wrong version of an application is being used, etc. In various examples, types of failures that are customer induced such as an invalid password for a username, the username is too long, username does not exist, prohibited characters (e.g., are used in a username, the username does not follow established username guideline patterns, etc., are analyzed. If the type of failure is not user induced, threat-detection system 102 may ignore it for deny list purposes.

Upon receiving various login-attempt event records 120, the log-management system 108 may use the source-IP-address information contained therein to send location queries 122 that include, e.g., are keyed to, those source IP addresses to the IP-to-geolocation database 110. IP-to-geolocation database 110 may process location queries 122 and return corresponding location-query results 124 to the log-management system 108. The returned location-query results 124 may include a geolocation, if one can be identified, for each of the source IP addresses in the various corresponding location queries 122. Such geolocation may be in terms of global positioning system (GPS) coordinates, a latitude and longitude, an area code, a zip code, a city, a region, a country, and/or the like.

Moreover, although pictured in FIG. 1 as data-storage containers, either or both of the data store 104 and the IP-to-geolocation database 110 may include, in addition to one or more data-storage devices, computers, servers, and/or the like, one or more database servers that operate to serve requests to carry out database operations, where such database operations may include operations to query data, store data, retrieve data, extract data, modify data, update data, remove data, and/or the like. Furthermore, although the data store 104 and the IP-to-geolocation database 110 are shown as being in respective single network locations in the communication context 100, either or both of the data store 104 and the IP-to-geolocation database 110 may include multiple different data silos in multiple different geographic and/or network-topology locations. Other data-storage architectures may be used as well.

As depicted in FIG. 1, the IP-to-geolocation database 110 may receive IP-to-geolocation-database updates 136, for example periodically and/or in response to requests transmitted by the IP-to-geolocation database 110 to a network server (not pictured) via the data network 112. A number of different IP-to-geolocation databases, services, and/or the like may be used in implementing the IP-to-geolocation database 110. Moreover, other architectural approaches may be used instead. For example, the login-processing system 106 may transmit the login-attempt event records 120 directly to the data store 104 for storage, and the data store 104 may then use an internal and/or external query and/or merge function to augment the respective login-attempt event records 120 with geolocation data indicative of the geographical location associated with, e.g., the source IP addresses of the respective login-attempt event records 120, which as discussed, correspond to the login requests 116.

As mentioned, in the architectural approach that is depicted in FIG. 1, the log-management system 108 transmits location-appended login-attempt event records 126 for storage at the data store 104, which may house one or more particular types of data pertaining to one or more of the applications operating within the ecosystem of the associated institution. In some examples, the data store 104 is implemented using a database management and analytics platform. In some examples, rather than or in addition to using a data store such as the data store 104, a real-time feed or stream of location-appended login-attempt event records 126 is used.

In various examples, the threat-detection system 102 transmits periodic login-attempt event-record queries 128 to the data store 104. The queries may be seeking the latest location-appended login-attempt event records 126 stored by the data store 104 since the previous one of the login-attempt event-record queries 128.

In various examples, the threat-detection system 102 sends the login-attempt event-record queries 128 to the data store 104 every 30 seconds, though certainly other periods (e.g., 10 seconds, 1 minute, 5 minutes, 30 minutes, 1 hour, etc.) may be used. In response to the login-attempt event-record queries 128, the data store 104 transmits login-attempt event-record updates 130 to the threat-detection system 102 on, e.g., the same period at which the login-attempt event-record queries 128 are sent by the threat-detection system 102 to the data store 104. Moreover, threat-detection system 102 may periodically (e.g., once every 30 seconds) assess a prior time window that has a duration (e.g., 60 minutes) that differs from the period at which the threat-detection system 102 receives the login-attempt event-record updates 130 from the data store 104. Either or both of these numbers can vary, but in at least one example, the threat-detection system 102 makes assessments every 30 seconds based on a rolling window of the hour that ended on the most recent 30-second boundary.

The inner workings of the threat-detection system 102 are discussed in more detail in connection with some of the other figures (e.g., FIG. 2). As an overview, threat-detection system 102 may maintain a system deny list, and determines whether any of the source IP addresses that are associated with a most recent group (e.g., the group corresponding to the previous hour, updated in the previous 30 seconds) of login-attempt event records 120 or location-appended login-attempt event records 126 obtained by the threat-detection system 102 in the login-attempt event-record updates 130 should be added to the system deny list.

As shown in FIG. 1, the login-processing system 106 sends deny list queries 132 to the threat-detection system 102, for example on a periodic basis such as once every 30 seconds (or a different period). In response to the deny list queries 132, the threat-detection system 102 sends deny list updates 134 to the login-processing system 106. In other embodiments, the threat-detection system 102 may send deny list updates 134 without receiving any deny list queries 132. For example, the threat-detection system 102 may send deny list updates 134 to the login-processing system 106 periodically without being asked, upon identifying a certain number of newly deny listed source IP addresses, upon identifying each newly deny listed source IP address, or according to another approach deemed suitable by those of skill in the art for a given implementation. Moreover, it is noted that any given instance of the deny list updates 134 may reflect no changes to the system deny list, or may reflect one or more additions to the system deny list and/or one or more subtractions from the system deny list.

In operation, the login-processing system 106 uses the system deny list, as updated according to the deny list updates 134, as one of its inputs in determining how to process the various login requests 116 that the login-processing system 106 receives from the client systems 114. Other aspects regarding the content and enforcement of the system deny list are discussed in connection with some of the other figures. In an example, the login-processing system 106 is configured to deny any of the login requests 116 that originate from a source address that is currently found on the system deny list.

In at least one example, the login responses 118 that correspond to any such login requests 116 do not inform the associated client systems 114 that they are being blocked or that their IP address is being blocked or that their IP address has been deny listed, or otherwise provide any such deny list-related information. Instead, in at least one example, the login-processing system 106 simply shunts such client systems 114 to the same page and/or message as any other login failure, where such page and/or message contains a generic, somewhat innocuous and intentionally uninformative indication that, for example, the provided combination of username and password does not match the system's records. Other implementations are possible.

Figure 2:
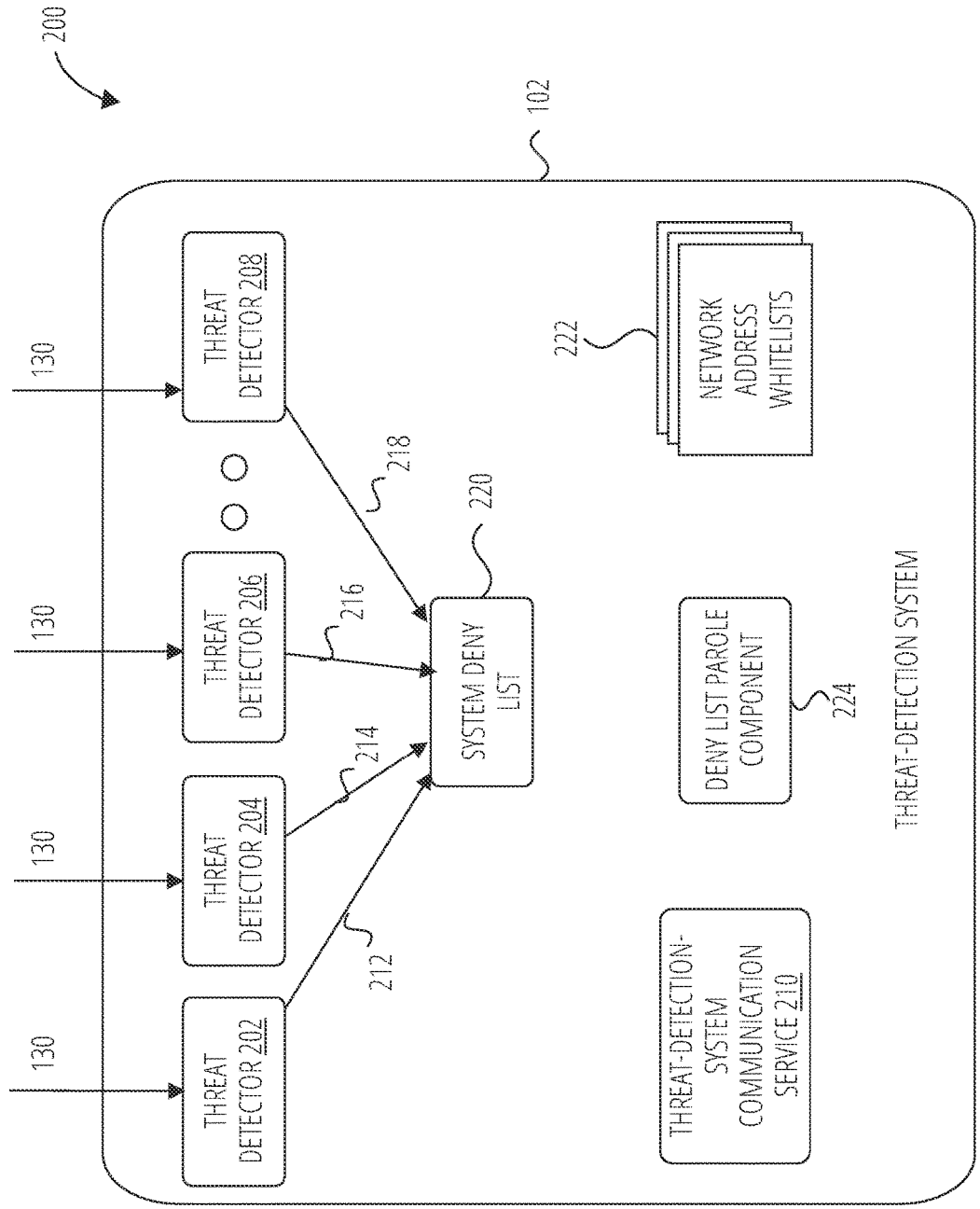
FIG. 2 is a diagram illustrating components of threat-detection system, according to various examples.

FIG. 2 is a diagram illustrating components of threat-detection system 102, according to various examples. As shown in FIG. 2, each of the threat detectors communicates a respective deny list feed to the system deny list 220: threat detector 202 communicates deny list feed 212, threat detector 204 communicates deny list feed 214, threat detector 206 communicates deny list feed 216, and threat detector 208 communicates deny list feed 218. In various examples, the detectors are configured in different ways to detect account validator actors.

Threat-detection-system communication service 210 may transmit login-attempt event-record queries 128 to the data store 104, as well as the deny list updates 134 to login-processing system 106. Threat-detection-system communication service 210 may receive deny list queries 132 from login-processing system 106: It is further noted that threat-detection-system communication service 210 may also handle the receipt and distribution to the various threat detectors of login-attempt event-record updates 130, and that the manner of depiction of login-attempt event-record updates 130 being received by the threat detectors themselves is, in some sense, for visual convenience and clarity.

In at least one embodiment, each of the threat detectors are authorized to add entries to the system deny list 220, and do so via their respective deny list feed or directly to system deny list 220. Each of the threat detectors can be thought of as a detection mechanism for a different type of threat and/or a different type of attack pattern. One or more of the threat detectors, as well as the threat-detection system 102 and/or one or more other entities described herein may be designed using a programming language such as Java, Python, Java Platform, Enterprise Edition (J2EE), C++, and/or the like.

For example, threat detector 202 may utilize a geotargeting machine-learning model to deny list source IP addresses based on, in some cases among other variables and features, aggregated login-failure rates in various different geographic slices. In an example, a source IP address may be determined to be associated with a city. As such, an example may assess login-attempt failure rates in one, some, or all of a city, region, country.

One or more of the threat detectors (e.g., threat detector 204) may evaluate system-login attempts using one or more cumulative sum control chart (CUSUM) techniques. Used in statistical quality control among other contexts, CUSUM is a sequential analysis technique that involves the iterative (i.e., sequential) calculation of a cumulative sum. In various examples of the present disclosure, one or more CUSUM models are used in one or more threat detectors, in addition to and in parallel with the machine-learning approaches disclosed herein, to detect aberrant behavior in connection with source IP addresses of login attempts, as described herein.

As a general matter, CUSUM models can be effective at detecting high-volume-per-source-IP address activity from a relatively low number of source IP addresses. The CUSUM models are what are known as statistical behavioral models, and different threat detectors implementing different CUSUM models may analyze different time slices (e.g., a recent 5 minutes, a recent 15 minutes, and a recent 60 minutes) in order to attempt to identify threats. These models may assess login-failure rates over these different time frames, and flag instances in which a login-failure rate during any such time frame exceeds a baseline amount by a threshold number (e.g., 3, 4, or 5) of standard deviations, as an example. Moreover, in at least one embodiment, potential threats (e.g., deny listed source IP addresses) identified using one or more CUSUM models are used to label training data for one or more machine-learning models. Further discussion of CUSUM models are discussed below with respect to FIG. 6 and FIG. 7.

In at least one embodiment, the multiple threat detectors in the threat-detection system 102 include a threat detector that identifies and removes false-positive entries from the system deny list 220. For example, such a threat detector may look for false positives to remove from the system deny list 220 by reviewing data from a previous 24-hour period.

In various examples, threat-detection system 102 may manage one or more network address allow lists 222. A allow list may be tied to a network address. There is a constant battle between companies' efforts to detect account validator actors and those actors determining that they have been detected. For example, it is common for an account validator actor to run the same set of credentials through a system multiple times. In such instances, if the account validator actor is detected during a first run, the associated network address may be added to system deny list 220. As discussed above, there may not be any indication given to the account validator actor when they are detected. Accordingly, if a username in the set of credentials goes through (e.g., the account validator actor can login) during the first run, but not the second run, the account validator actor may be able to deduce they have been added to a deny list.

To avoid giving this type of information to the AVA, a allow list may be maintained for a network address when the network address is added to system deny list 220. The allow list may include usernames that had successful login attempts originating from the network address in the past 24 hours (or other configurable length of time). Thus, if a subsequent login attempt is made using the allow listed username, from the network address, the login attempt is permitted to go through despite the network address being on system deny list 220. The security risk of allowing the login attempt may be low as the account validator actor already knows the credentials are valid. Additionally, threat-detection system 102 may have already initiated mitigation workflows (e.g., notifying the user to change their password, locking the account to prevent any actual transactions from taking place, etc.).

Another of the threat detectors may look for repeated nonce values in transactions. These nonce values are single-use random or pseudorandom numbers or other character strings that are associated with or inserted into the packets related to a given transaction. They are meant for a single transaction, so repeated appearance of the same nonce value in connection with multiple transactions typically indicates the potential presence of a bad actor.

Thus, via threat-detection-system communication service 210, threat-detection system 102 delivers, by collective action of the threat detectors, system deny list 220 to the login-processing system 106 in the form of the deny list updates 134. The system deny list 220 can include, in various different embodiments, deny listed data items related to login attempts, where the deny listed data items are of types such as IP network addresses (e.g., source IP addresses), usernames, user agent strings, one or more other request header parameters, nonce values, device identifiers, and/or the like.

Moreover, in at least one embodiment, the threat-detection system 102 manages the source IP addresses on the system deny list in accordance with an aging protocol. For example, deny list parole component 224 may determine a length of time a network address (or other deny listed item identifier) is to remain on the deny list. Further discussion of how deny list parole component 224 may determine the length of time is discussed with respect to FIG. 3.

Figure 3:
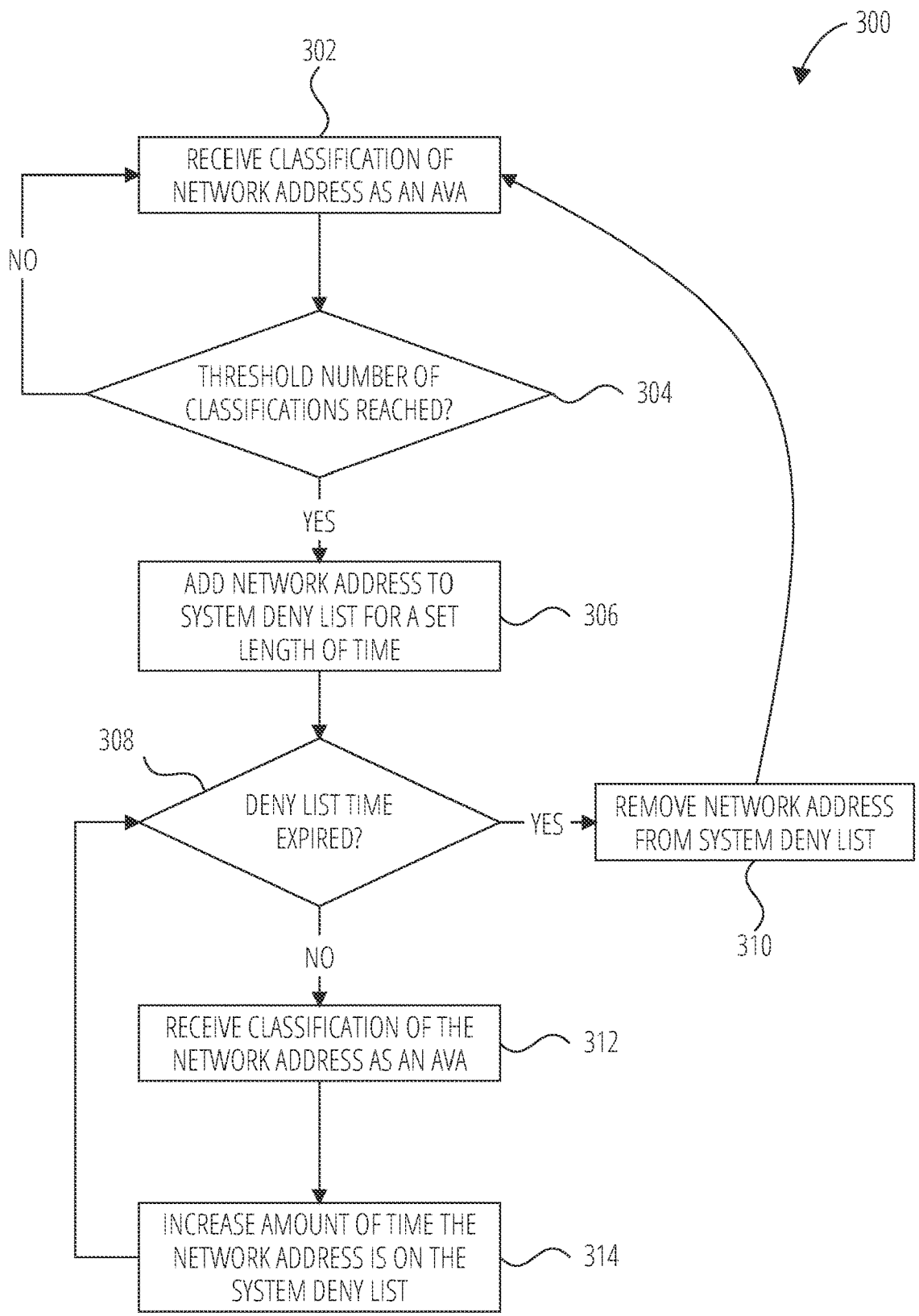
FIG. 3 is a flowchart illustrating a method of adding a network address to a deny list, according to various examples.

FIG. 3 is a flowchart 300 illustrating a method of adding a network address to a deny list, according to various examples. The method may be performed by components such as deny list parole component 224, The method is represented as a set of blocks that describe operations and decision blocks 302-314. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 3 The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation block 302, a classification of a network address (e.g., a source IP address) may be received indicating that the network address is likely an AVA. If the network address is not already on system deny list 220, the network address may not immediately be added, in various examples.

For example, there may be a threshold number of classifications needed before the network address is initially added. The threshold may be an absolute number or a frequency of classifications (e.g., 5 classifications in 15 minutes) in various examples. In some examples, there may be a requirement that more than detector has classified the network address as an AVA before adding it to system deny list 220. Accordingly, at decision block 304 it may be determined if the classification of operation block 302 means the threshold number of classifications has been reached. If not, flow continues back to operation block 302 to await a further classification.

If decision block 304 indicates that the threshold has been reached, at operation block 306 the network address may be added to system deny list 220 for a set length of time. The set length of time may be a short period of time such as 5 minutes (although other lengths of time may be used).

If no other detectors indicate that the network address is an AVA during the set length of time e.g., decision block 308 indicates the deny list time has expired then the network address may be removed from the system deny list at operation block 310.

However, the deny list time as set in operation block 306 may not have expired. Then, another classification may be received indicating the network address is an AVA at operation block 312. In response to operation block 312, the amount of time the network address is on the system deny list may be increased.

As seen, there may be a distinction between how many detections of a network address are required to add a network address to the system deny list initially and how many detections are needed to maintain that network address on the deny list. Accordingly, once on the deny list, the network address may be on "parole" and any detector that indicates that the network address is an AVA means an increased amount of time on the system deny list. In other examples, however, there may still be a requirement of multiple classifications before adding time at operation block 312.

The amount of time that is added at operation block 312 may be based on a variety of factors. In one example, there may a doubling of time on the deny list for each subsequent classification (e.g., 5 minutes, 10, 20, 40, 80, 160, 320, 640), There may be a maximum length of time that the increase may be. For example, the maximum amount of time may be eight hours. Accordingly, even if the network address is classified as an AVA five minutes into the beginning of the eight-hour "sentence" the increase at operation block 314 may only be five minutes.

In various examples, once a network address is off the system deny list, it may be as if the network address was never on the system deny list. Accordingly, if one minute after the deny list time has elapsed, the network address is classified by a detector as AVA, the set amount of time at operation block 306 may be five minutes—just as if the address had never been on the system deny list.

Figure 4:
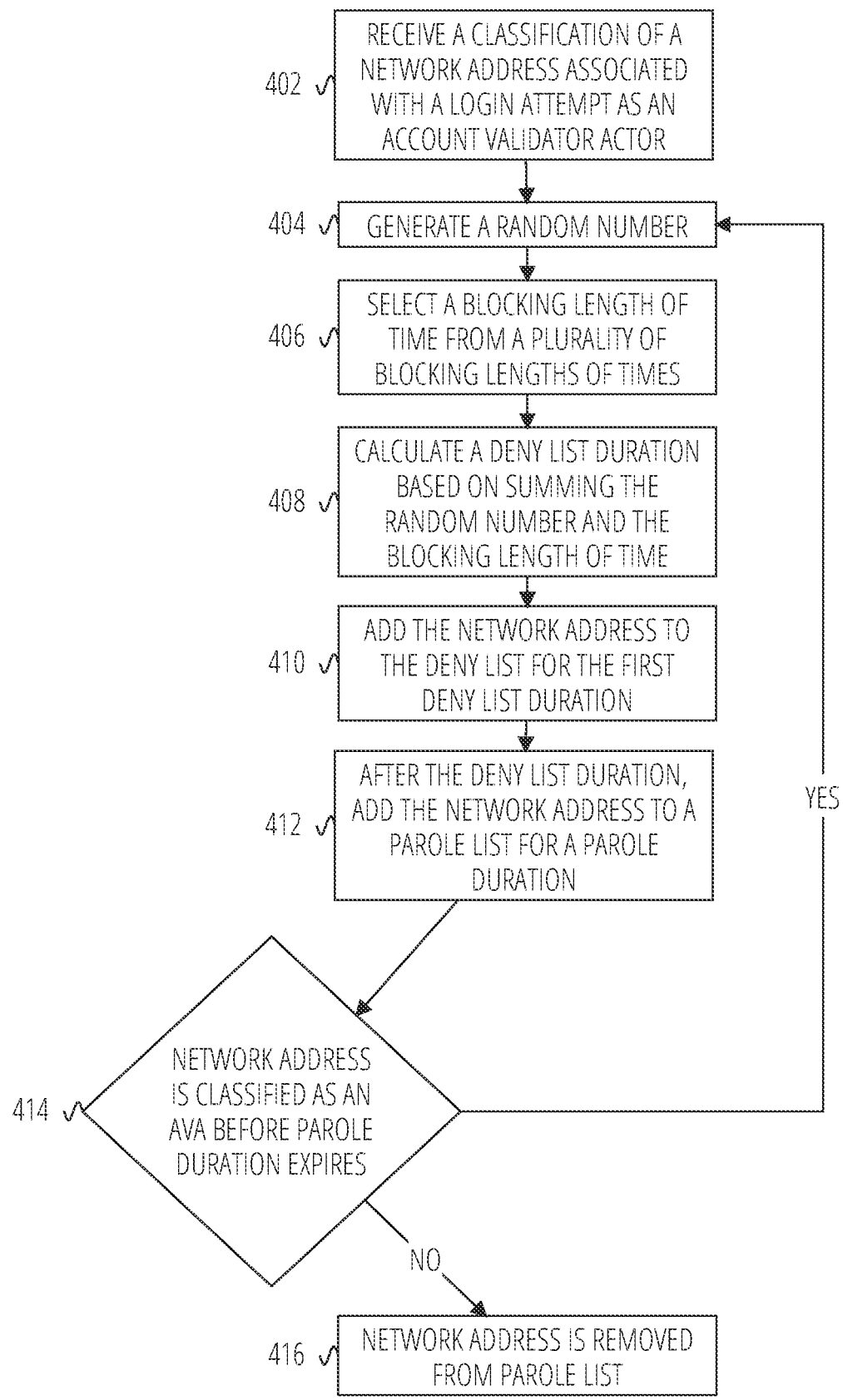
FIG. 4 is a flowchart illustrating a method of adding a network address to a deny list for a randomized amount of time, according to various examples.

FIG. 4 is a flowchart illustrating a method of adding a network address to a deny list for a randomized amount of time, according to various examples. The method may be performed by components such as deny list parole component 224. The method is represented as a set of blocks that describe operations operation and decision blocks 402-414. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4 The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 402, a classification (e.g., a first classification) of a network address associated with a login attempt as an AVA is received. The classification may be based on one or more detectors described in FIG. 2.

Consider that this is the first time the network address has been classified as an AVA. As such, the network address is to be added to the deny list for a certain duration. To determine the duration, a two-step calculation may be performed that creates a randomized, but bounded, deny list duration. By introducing a randomized element to the deny list duration, an 1-WA may not know when to start trying to validate accounts again even if they are able to figure out if a graduated deny list scale is used as described above. Additionally, the use of a parole list as discussed below adds yet another element of unpredictability of when a network address may be added/removed to the deny list.

To determine the deny list duration, a random number may be generated at operation 402. The random number may be generated using a hardware or software-based random number generator. The random number may be bounded between a lower bound (e.g., 1) and an upper-bound (e.g., 300). The number may represent the number of seconds to add to a base blocking length of time. As indicated previously, blocking may not mean the network address receives an error-page (e.g., 404 error) or that the connection is refused, but rather the network address is presented with an incorrect login, etc., page as if someone had entered in the wrong credentials.

The blocking length of time may be selected from a plurality of blocking lengths of time at operation 406. The plurality of blocking lengths of time may be a series of escalating times (e.g., 5 minutes, 10, 20, 40, an hour, two hours, four hours, eight hours) that a network address is to be added to a system deny list. The blocking length of time may be selected based on the previous blocking length of time for the network address for a given parole period. For example, if a network address was previously blocked for 5 minutes, the next blocking length of time may be 10 minute. If, however, the network address was previously blocked for 5 and then made it through the parole duration without further classification, the next blocking length of time may be 5 minutes, again.

At operation 408, a deny list duration may be calculated by summing the random number generated at operation 404 to the blocking length of time selected at operation 406. At operation 410, the network address may be added to the deny list (e.g., system deny list 220) for the deny list duration.

After the deny list duration expires, the network address may be removed from the deny list and the network address may be added to a parole list at operation 412. A parole list may include a plurality of network addresses and when each network address was added, in various examples. The parole list may be stored as part of threat-detection system 102 in various examples. The length of time a network address may be fixed each time the network address is added; in contrast to an escalating length of time as with a blocking length of time. In other examples, the time on the parole list may increase.

At decision block 414 it may be determined if the network address is classified as an AVA again (e.g., a second classification) during the time the network address is on the parole list. If yes, control flows back to operation 404 where a new random number is generated and a new blocking length of time is selected. The blocking length of time may be the same as the previous blocking length of time if the previous blocking length of time was already at the maximum of the plurality of blocking lengths of time. A second deny list duration may be calculated by summing the new random number with the new selected blocking length of time, in various examples, after the second deny list duration has lapsed, the parole duration may be reset.

If, at decision block 414 the network address is not classified as an AVA again, control flows to operation 416. At operation 416, the network address may be removed from the parole list. Accordingly, if the network address is subsequently classified as an AVA, the lowest possible blocking length of time may be selected from the plurality of blocking lengths of time.

A CUSUM control chart is a method of looking at a process variation in its typical use in manufacturing; for AVA detection, it may be used to look at variations in login failure behavior. A CUSUM control chart monitors the deviations of subgroup averages (values), from a target value, which is a normal login failure rate. The cumulative sum is the sum of these deviations over time.

If a sample result is within the allowable "slack", the process is considered to be operating on target: This results in a subtraction from the cumulative sum unless it is already, zero. If a sample result is beyond the allowable slack, the process is considered to be operating off target. This results in an addition to the cumulative sum. If the cumulative sum exceeds the action limits, the process is assumed to be off target or out-of-bound.

Figure 5:
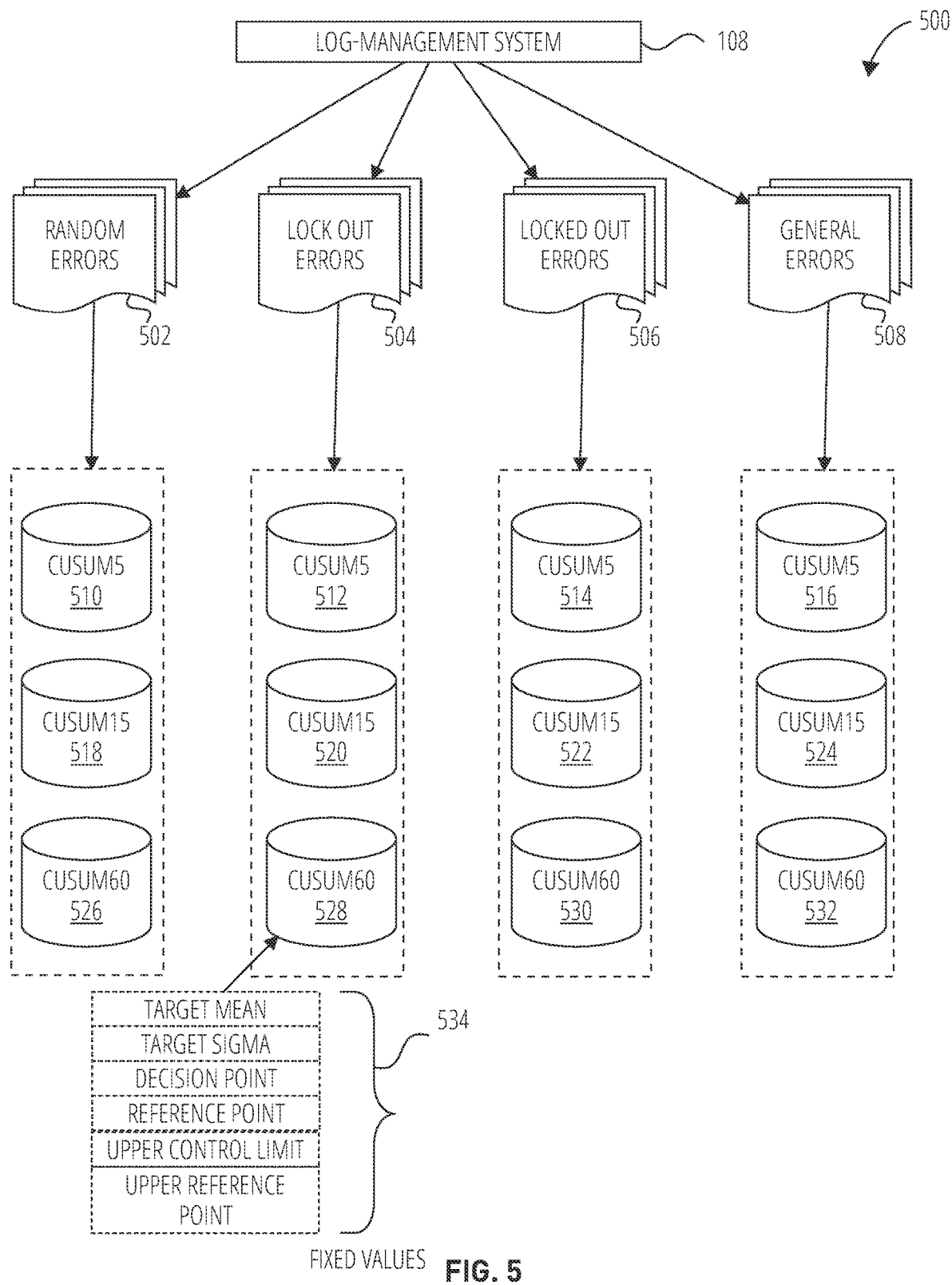
FIG. 5 is a diagram illustrating cumulative sum models, according to various examples.

The CUSUM detection models CUSUM, CUSUM15 and CUSUM60, look at login failures in 5-minute increments, with a 15 or 60-minute look-back. In other words, the 15-minute model calculates the CUSUM values every 5 minutes by looking back for the prior 15 minutes FIG. 5 is a diagram 500 illustrating generating cumulative sum models, according to various examples. Diagram 500 includes error data from four types of login errors that may be present in log-management system 108: random errors 502, lock out errors 504, locked out errors 506, and general errors 508. Additionally, diagram 500 included 12 different cumulative sum (CUSUM) models: As illustrated, they are grouped according to error type. Each error has three different models based on the window length: one CUSUM model for 5 minutes (CUSUM5 510, CUSUM5 512, CUSUM5 514, and CUSUM5 516), one for a 15 minute window (CUSUM15 518, CUSUM15 520, CUSUM15 522, and CUSUM15 524) and, and one for a 60 minute window (CUSUM60 526, CUSUM60 528, CUSUM60 530, and CUSUM60 532).

In various examples, random errors 502 may be errors due to invalid usernames (aka random names). Lock out errors 504 may be errors with usernames that get locked out due to invalid login attempts. Locked out errors 506 may be usernames that were already locked out. General errors 508 may be general errors pertaining to credential identification such as those relating to input formatting, missing values, invalid password/username, disabled account, etc. There may be overlap between groups such that a particular error may be included in more than one group. For example, there may be some random error types that also are considered a general error.

Generating a CUSUM may include generating fixed values 534 for each model based on examining historical rates of login errors per IP for the time window. Fixed values 534 may be calculated in different ways depending on the different window of time the CUSUM covers. The general process, however, may be the same no matter the window size.

As an example, consider the generation of CUSUM60 528. CUSUM60 528 is associated with the lock out errors 504 type of login error. Accordingly, generating fixed values 534 for it may begin with gathering historical log data from log-management system 108 that includes data on lock out errors. In an example, a 30-day set of data is used.

The log data may be filtered before generating fixed values 534 to reduce the chance of false positives. For example, most of log data will have an average of one error per window of time. This may be because, historically, most login attempts do not fail, and if they fail, they fail once or twice. Accordingly, the log data may be filtered to remove errors that only occur below a certain threshold. For the 5 minute and 15 window CUSUM models, errors two and below may be removed. For 60-minute window CUSUM models, errors four and below may be filtered out. In all cases, the top and bottom quartiles may be filtered out as well. Different amounts of data may be filtered without departing from the scope of this disclosure.

Using the filtered data set (e.g., the data remaining), fixed values 434 may be calculated and stored within a CUSUM model. For example, the Target M Target Mean (U 0) may be calculated as:

$$U_0 = \frac{1}{n} \cdot \sum_{i=1}^{n} x_i$$

Target Sigma (a) or standard deviation $$\sigma = \sqrt{\frac{1}{N} \cdot \sum_{i=1}^{N}(x_i - \mu)^2}$$

Reference Point (k) the "slack" set at 0.5*standard deviation
Decision Point (h) set at 5*standard deviations
Upper Reference Point (K): Kσ or 0.5*σ
Upper Control Limit (H): Hσ or 5*σ

When used as a detector, a set of dynamic real time measures may be gathered to determine if a network address should be added to the deny list. For example, every 5 minutes the models gather the numbers of failures for each of the four error types by IP address for the prior 5, 15 and 60 minutes. Then the mean is calculated for each error and time window, which is compared to the target value plus the "slack" or reference point (ZBar). Finally, the ZBar is added to the CUSUM value, and if it exceeds the Decision Point, it is considered "out of control" or AV, and added to the system deny list.

Current Mean $$(\bar{X}_i): \bar{X} = \frac{1}{n} \cdot \sum_{i=1}^{n} x_i$$

ZBar $(Z_i) = X_i - (U_0 + K)$
CUSUM: $S_i^+ = \text{Min}(\text{Max}(0, Z_i + S_{i-1}^+)H)$ A hypothetical example below shows how a CUSUM may work in practice. Consider the following CUSUM model values: Target Mean–4.471262; Standard Deviation–1.002277; Upper Reference Point–0.5*1.002277=0.5011385; and Upper Control Limit–5*1.002277=5.002277.

At a first five-minute window consider that the mean is 10. Accordingly, ZBar=10-(4.471262+0.5011385)= 4.9724005. CUSUM=0+4.9724005=4.9724005 [initial reading so prior CUSUM is 0]. Because the CUSUM is less than the decision point, no action may be taken.

At the next five-minute consider that the mean is 9. ZBar=9-(4.471262+0.5011385)=4.0275995. Additionally, CUSUM=4.528738+4.0275995>Upper Control. Limit, so it is set to it 5.002277. As discussed, ZBar adds to the prior CUSUM value. Because CUSUM cannot exceed the Upper Control Limit, CUSUM may be reduced from its nominal value.

Figure 6:
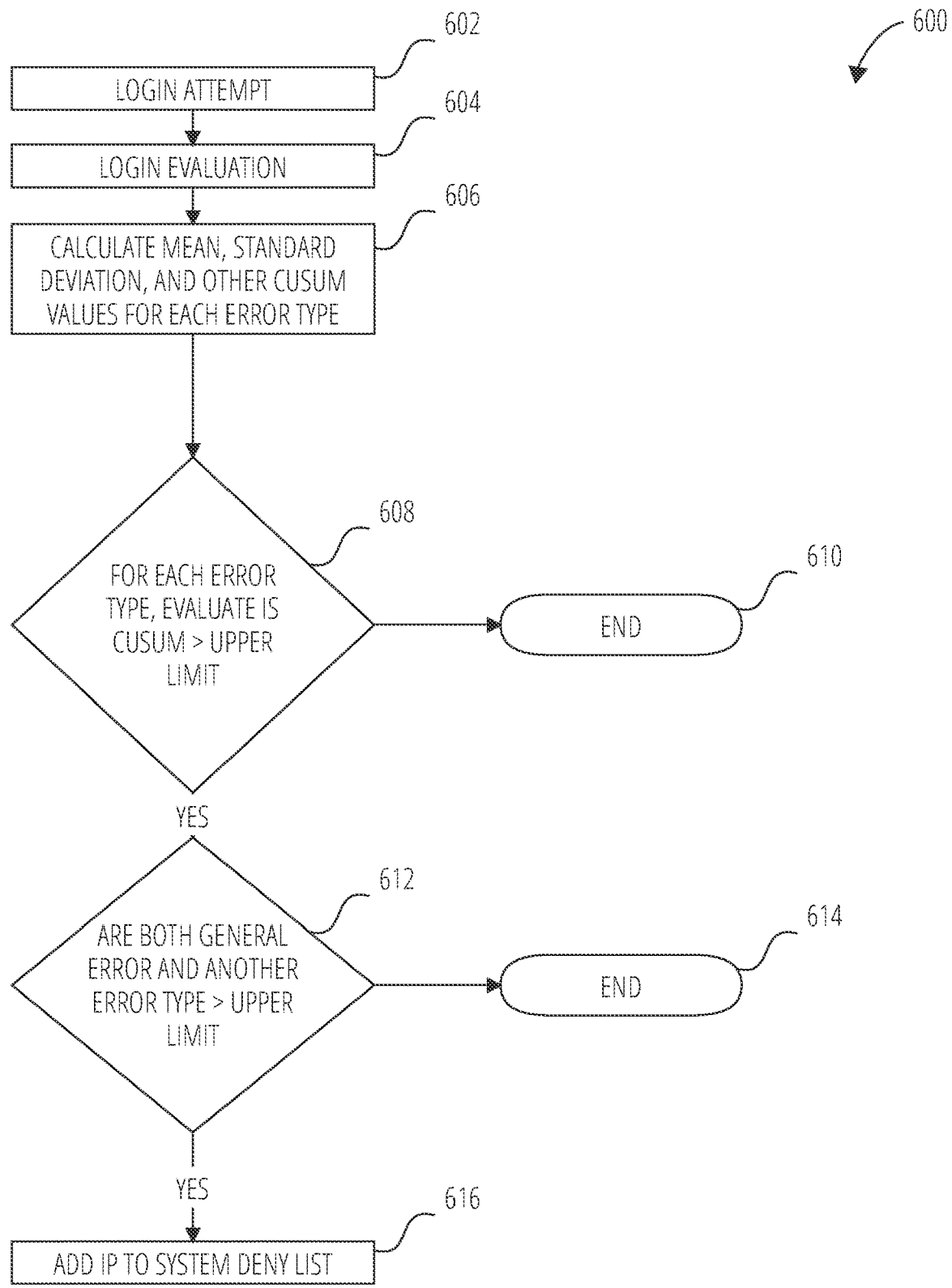
FIG. 6 is a flowchart illustrating a method of adding a network address to a deny list, according to various examples.

FIG. 6 is a flowchart 600 illustrating a method of adding a network address to a deny list, according to various examples. The method may be performed by components such as depicted in threat-detection system 102. The method is represented as a set of blocks that describe operations operation and decision blocks 502-516 The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6 The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation block 602, a login attempt is received and evaluated at operation block 604. For example, the login attempt may originate from client systems 114 and be processed by login-processing system 106.

If the login attempt fails, CUSUM values may calculated for each error type at operation block 606. Thus, if 12 CUSUM models are used as depicted in FIG. 5, 12 different CUSUM values may be calculated. The CUSUM values may be calculated with respect to the network address associated with the login attempt. Accordingly, operation block 606 may begin with looking at the average number of login attempts for each window of time (e.g., the average number of attempts every 5 minutes for the past 15 minutes).

For each CUSUM value, it may be determined if the CUSUM is greater than its respective upper limit. If none are over their upper limit the method may end at done block 610. If at least CUSUM value for an error type is above its respective limit flow continues to decision block 612. At decision block 612, it may be determined whether there are at least two error types (one general and one other) that have exceeded their upper limit. Requiring two error types to exceed their upper limits may reduce the number of false positives of innocuous IP addresses being added to the system deny list. If the conditions of decision block 612 are met, the IP address of the originating login attempt may be placed on the system deny list.

Figure 7:
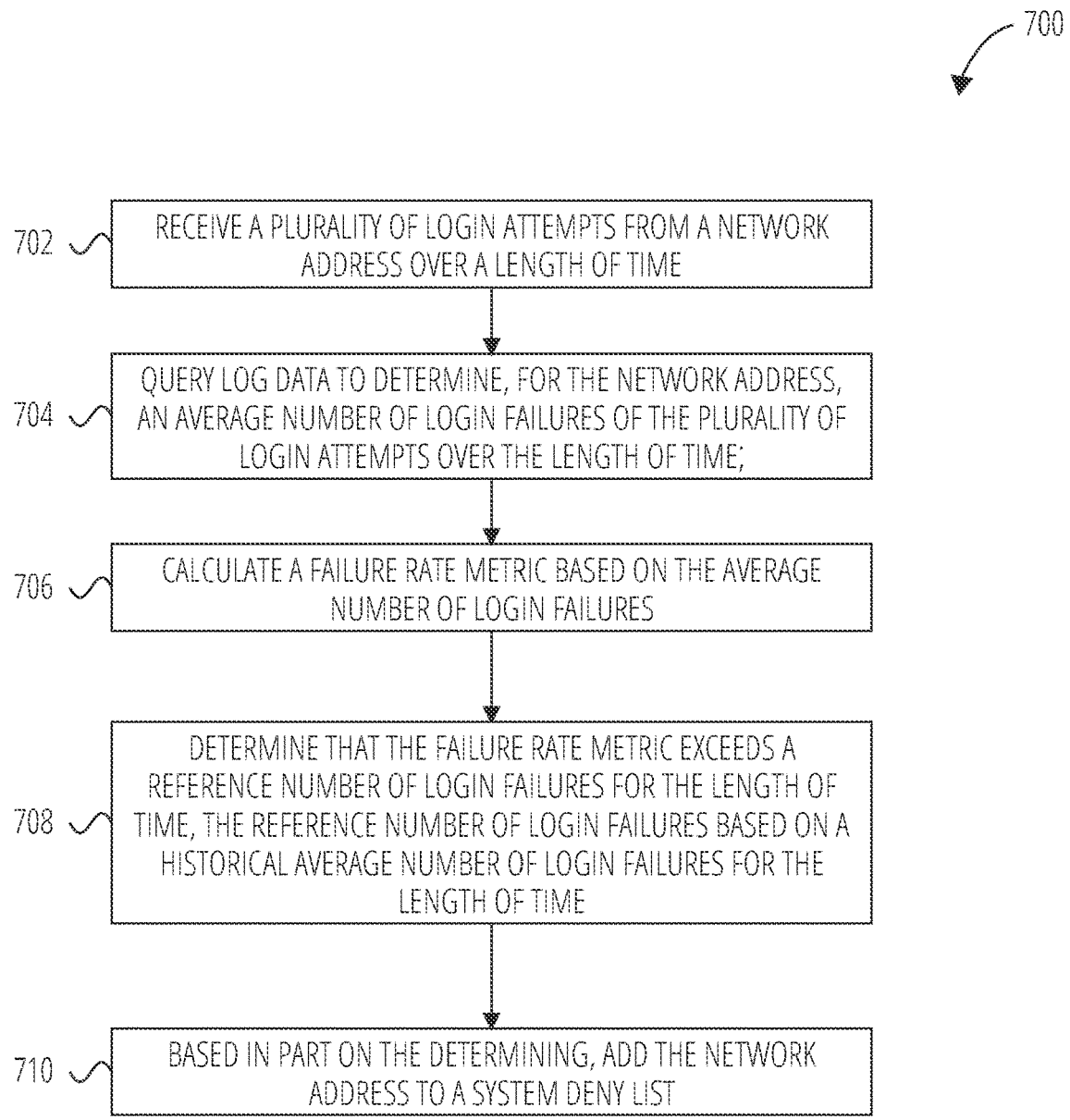
FIG. 7 is a flowchart illustrating a method of adding a network address to a deny list, according to various examples.

FIG. 7 is a flowchart 700 illustrating a method of adding a network address to a deny list, according to various examples. The method may be performed by components such as depicted in threat-detection system 102. The method is represented as a set of blocks that describe operations operation and decision blocks 602-610 The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6 The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation block 702, a plurality of login attempts may be received from a network address over a length of time. For example, the login attempts may originate from client systems 114 and be stored by log-management system 108. If the login attempts failed, log-management system 108 may store when the failure occurred and what type(s) of failure it was.

In operation block 704, the log data may be queried to determine, for the network address, an average number of login failures of the plurality of login attempts over the length of time. For example, threat detector 204 may query location-appended login-attempt event records 126 for the log data. Threat detector 204 may calculate the average based on multiple windows. For example, if the length of time is five minutes, threat detector 204 may look at the past 15 minutes and for each five-minute period (1-5, 6-10, 11-15) see how many login attempts came from the network address, which may then be averaged. As with the original attempt, in various examples, only failed login attempts may be analyzed.

In operation block 706, a failure rate metric may be calculated based on the average number of login failures. For example, the failure rate metric may be a CUSUM value based on deviations between the average number of login failures and the historical average number of login failures as discussed in more detail above. In various examples, the reference number of login failures is based on values stored in a cumulative sum model for the length of time. For example, the reference number may be the calculated upper control limit.

Furthermore, the average may be for a particular error type. Multiple averages for multiple windows of times may be also be calculated. In various examples, CUSUM values are calculated for multiple windows and multiple error types. In various examples, the reference number of login failures is based on a multiple of a standard deviation of past login failures for the length of time.

In operation block 708, it may be determined that the failure rate metric exceeds a reference number of login failures for the length of time. The reference number of login failures may be based on a historical average number of login failures for the length of time. The reference number of login failures may be for a particular error type and may match the error type of data queried.

In operation block 710, flowchart 700 based in part on the determining, adds the network address to a system deny list. In various examples, the operations of 604, 606, and 608 are performed again, but with respect to a second login failure type. Adding the network address may also be based on determining that the second failure rate metric for the second type exceeds a second reference number of login failures of the second login error type for the length of time. The second reference number of login failures of the second login error type may be based on a historical number of login failures of the second login error type for the length of time. In various example, the address is not added unless the first references umber of login failures and second reference number of login failures are exceeded.

Figure 8:
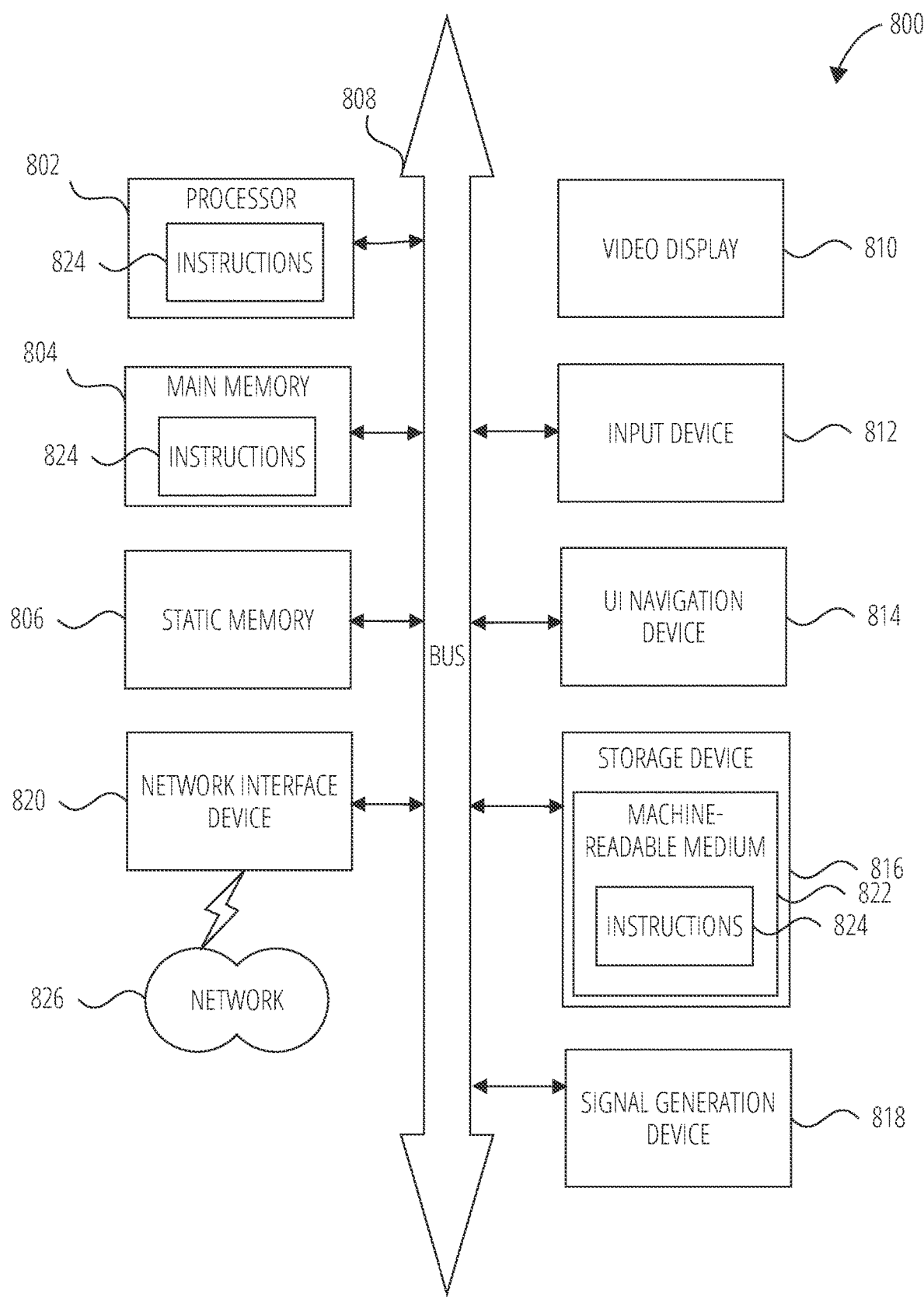
FIG. 8 is a block diagram illustrating an example machine upon which any one or more of the techniques (e.g., methodologies) discussed herein may be performed, according to various examples.

FIG. 8 is a block diagram illustrating a machine in the example form of computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a bus 808. The computer system 400 may further include a video display 810, an input device 812 (e.g., a keyboard), and a user interface (UT) navigation device 114 (e.g., a mouse). In one embodiment, the video display 810, input device 812, and UI navigation device 814 are incorporated into a single device housing such as a touch screen display. The computer system 400 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensors.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 100, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 822 that excluded transitory signals.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., 3G, 4G LTE/LTE-A or WiMAX networks, and 5G) The term "transmission medium" shall be taken to include any intangible medium that is capable of storing, encoding, or carrying instructions for execution by the machine, and includes digital or analog communications signals or other intangible medium to facilitate communication of such software.

What is claimed is:

1. A method comprising:
   receiving a plurality of login attempts from a network address over a first length of time and a second length of time, the second length of time being longer than the first length of time;
   querying log data to determine, for the network address, a first average number of login failures of the plurality of login attempts over the first length of time and a second average number of login failures of the login attempts over the second length of time by:
      segmenting the first length of time into a plurality of equal length segments; and
      averaging the number of login failures that occur in each of the equal length segments to generate the first average number of login failures;
   calculating, using a threat-detection system executing on a processing unit, a first failure rate metric based on the first average number of login failures;
   calculating, using the threat-detection system executing on the processing unit, a second failure rate metric based on the second average number of login failures;
   first determining that the failure rate metric exceeds a first reference number of login failures for the first length of time, the first reference number of login failures based on a historical average number of login failures for the first length of time;
   second determining that the second failure rate metric exceeds a second reference number of login failures for the second length of time, the second reference number of login failures based on a historical average number of login failures for the second length of time; and
   based in part on the first determining and second determining, adding the network address to a system deny list.

2. The method of claim 1, wherein the first average number of login failures are for a login error type of a plurality of login error types.

3. The method of claim 2, wherein the second average number of login failures are for the login error type.

4. The method of claim 2, further comprising:
   generating the first reference number of login failures by:
   querying the log data for login errors having the login error type of the plurality of login error types; and
   filtering results of the query to exclude login errors that occur below a frequency threshold amount of time.

5. The method of claim 1, wherein the first reference number of login failures is based on values stored in a cumulative sum model for the first length of time.

6. The method of claim 1, wherein the first reference number of login failures is based on a multiple of a standard deviation of past login failures for the first length of time.

7. A non-transitory computer-readable medium comprising instructions, which when executed a processing unit, configure the processing unit to perform operations comprising:
   receiving a plurality of login attempts from a network address over a first length of time and a second length of time, the second length of time being longer than the first length of time;
   querying log data to determine, for the network address, a first average number of login failures of the plurality of login attempts over the first length of time and a second average number of login failures of the login attempts over the second length of time by:
  segmenting the first length of time into a plurality of equal length segments; and
  averaging the number of login failures that occur in each of the equal length segments to generate the first average number of login failures;
calculating, using a threat-detection system executing on the processing unit, a first failure rate metric based on the first average number of login failures;
calculating, using the threat-detection system executing on the processing unit, a second failure rate metric based on the second average number of login failures;
first determining that the failure rate metric exceeds a first reference number of login failures for the first length of time, the first reference number of login failures based on a historical average number of login failures for the first length of time;
second determining that the second failure rate metric exceeds a second reference number of login failures for the second length of time, the second reference number of login failures based on a historical average number of login failures for the second length of time; and
based in part on the first determining and second determining, adding the network address to a system deny list.

8. The non-transitory computer-readable medium of claim 7, wherein the first average number of login failures are for a login error type of a plurality of login error types.

9. The non-transitory computer-readable medium of claim 8, wherein the second average number of login failures are for the login error type.

10. The non-transitory computer-readable medium of claim 8, wherein the instructions, which when executed by the processing unit, further configure the processing unit to perform operations comprising:
  generating the first reference number of login failures by:
    querying the log data for login errors having the login error type of the plurality of login error types; and
    filtering results of the query to exclude login errors that occur below a frequency threshold amount of time.

11. The non-transitory computer-readable medium of claim 7, wherein the first reference number of login failures is based on values stored in a cumulative sum model for the first length of time.

12. The non-transitory computer-readable medium of claim 7, wherein the first reference number of login failures is based on a multiple of a standard deviation of past login failures for the first length of time.

13. A system comprising:
a processing unit; and
a storage device comprising instructions, which when executed by the processing unit, configure the processing unit to perform operations comprising:
  receiving a plurality of login attempts from a network address over a first length of time and a second length of time, the second length of time being longer than the first length of time;
  querying log data to determine, for the network address, a first average number of login failures of the plurality of login attempts over the first length of time and a second average number of login failures of the login attempts over the second length of time by:
    segmenting the first length of time into a plurality of equal length segments; and
    averaging the number of login failures that occur in each of the equal length segments to generate the first average number of login failures;
  calculating, using a threat-detection system executing on the processing unit, a first failure rate metric based on the first average number of login failures;
  calculating, using the threat-detection system executing on the processing unit, a second failure rate metric based on the second average number of login failures;
  first determining that the failure rate metric exceeds a first reference number of login failures for the first length of time, the first reference number of login failures based on a historical average number of login failures for the first length of time;
  second determining that the second failure rate metric exceeds a second reference number of login failures for the second length of time, the second reference number of log in failures based on a historical average number of login failures for the second length of time; and
  based in part on the first determining and second determining, adding the network address to a system deny list.

14. The system of claim 13, wherein the first average number of login failures are for a login error type of a plurality of login error types.

15. The system of claim 14, wherein the second average number of login failures are for the login error type.

16. The system of claim 14, wherein the instructions, which when executed by the processing unit, further configure the processing unit to perform operations comprising:
  querying the log data for login errors having the login error type of the plurality of login error types; and
  filtering results of the query to exclude login errors that occur below a frequency threshold amount of time.

17. The system of claim 13, wherein the first reference number of login failures is based on values stored in a cumulative sum model for the first length of time.

* * * * *